United States Patent
Berriah et al.

(10) Patent No.: US 12,366,000 B2
(45) Date of Patent: Jul. 22, 2025

(54) METHODS AND SYSTEMS FOR DETECTING CONTAMINATION IN ELECTROLYSIS CELLS

(71) Applicant: RECHERCHE 2000 INC., Montréal (CA)

(72) Inventors: Said Berriah, Laval (CA); Helmut Lademann, Hurth (DE); Gilles J. Tremblay, Montréal (CA)

(73) Assignee: RECHERCHE 2000 INC., Montreal (CA)

( * ) Notice: Subject to any disclaimer, the term of this patent is extended or adjusted under 35 U.S.C. 154(b) by 906 days.

(21) Appl. No.: 17/536,166

(22) Filed: Nov. 29, 2021

(65) Prior Publication Data
US 2022/0170170 A1 Jun. 2, 2022

Related U.S. Application Data

(60) Provisional application No. 63/119,097, filed on Nov. 30, 2020.

(51) Int. Cl.
*C25B 15/023* (2021.01)
*G05B 23/02* (2006.01)

(52) U.S. Cl.
CPC .......... *C25B 15/023* (2021.01); *G05B 23/024* (2013.01)

(58) Field of Classification Search
CPC .......... C25B 15/023; C25B 1/46; C25B 9/70; C25B 15/031; G05B 23/024;
(Continued)

(56) References Cited

U.S. PATENT DOCUMENTS

| 11,102,404 B2 | 8/2021 | Yang et al. |
| 2007/0208519 A1 | 9/2007 | Veillette et al. |

(Continued)

FOREIGN PATENT DOCUMENTS

| EP | 0136806 | 4/1985 |
| EP | 2226411 | 9/2010 |

(Continued)

OTHER PUBLICATIONS

Batista, Luana et al: "A Multi-Expert System for chlorine electrolyzer monitoring", Expert Systems With Applications, Elsevier, Amsterdam, NL, vol. 40, No. 8, Jan. 2, 2013 (Jan. 2, 2013), pp. 3128-3136, XP028982539, ISSN: 0957-4174, DOI: 10.1016/J.ESWA.2012.12. 094.

*Primary Examiner* — Mi'schita' Henson
(74) *Attorney, Agent, or Firm* — NORTON ROSE FULBRIGHT CANADA LLP

(57) ABSTRACT

Real-time data from cells is recorded during operation of an electrolyzer. Synthetic data is generated based on historical data of the electrolyzer and the cells, the synthetic data comprising synthetic cell voltages and synthetic product output flow, synthetic anolyte pH, feed brine pH, or oxygen in chlorine gas concentration of the electrolyzer. Cell-specific k-factors or $U_0$ are determined from the historical data. A slow contamination is detected when a difference between the synthetic product output flow, synthetic anolyte pH, feed brine pH, or oxygen in chlorine gas concentration and a real-time product output flow, anolyte pH, feed brine pH, or oxygen in chlorine gas concentration exceeds a first threshold. A fast contamination is detected when cell-specific k-factors or $U_0$ exceed a second threshold and a trend of a difference between the synthetic cell voltages and real-time cell voltages or a derivative of the difference meets or exceeds a conditional logic rule.

20 Claims, 10 Drawing Sheets

(58) Field of Classification Search
CPC . G05B 23/0235; G06F 30/27; G06F 2119/08; G06N 3/04; G06N 3/08
See application file for complete search history.

(56) References Cited

U.S. PATENT DOCUMENTS

2015/0021193 A1   1/2015  Verfub et al.
2021/0222309 A1*  7/2021  Berriah .................... C25B 1/34

FOREIGN PATENT DOCUMENTS

JP      2013525603         6/2013
JP      2014520963         8/2014
WO      WO-2006133562 A1 * 12/2006  ............... C25B 1/26

* cited by examiner

METHODS AND SYSTEMS FOR DETECTING CONTAMINATION IN ELECTROLYSIS CELLS

CROSS REFERENCE TO RELATED APPLICATIONS

This patent application claims priority of U.S. provisional Application Ser. No. 63/119,097, filed on Nov. 30, 2020, the entire contents of which are hereby incorporated by reference.

TECHNICAL FIELD

The present disclosure relates generally to electrolysis processes, where a contamination of the feed electrolytes causes a change in cell voltage or efficiency of the electrochemical reaction and more particularly to the real-time detection of membrane, cell separator and electrode poisoning or performance degradation by contaminants as well as any harmful operating conditions in Chlor-Alkali, water electrolysis, fuel cells or any other industrial electrolysis cells.

BACKGROUND OF THE ART

Industrial electrolysis processes such as Chlor-Alkali consist of decomposing a lower value chemical (e.g. NaCl, KCl, HCl) into a higher value chemical (e.g. NaOH, $Cl_2$, KOH) by applying a direct electrical current. This reaction take place in an electrochemical cell. In an industrial setting, several cells are combined in series or parallel to perform the reaction. This combination is called an electrolyzer.

Most Industrial electrochemical cells are composed of an anode, a cathode and a separator. An oxidation reaction takes place at the anode and a reduction reaction takes place at the cathode. As an example, for Chlor-Alkali electrochemical cells, primary products of electrolysis are chlorine, hydrogen and sodium or potassium hydroxide, also called "caustic". After abandoning mercury electrolysis cells for environmental and economic reasons, chlorine electrolysis using cation-exchange membranes became widely used in the industry because of the advantages of its high current efficiency and low electrical resistance. One of the downsides of using the membranes as separators in the industrial electrolysis processes is its sensitivity to the purity of the inlet brine. The presence of contaminants in the inlet brine affects the lifetime, current efficiency, and electrical resistance of the membrane. Therefore, improvements are needed.

SUMMARY

In accordance with a broad aspect, there is provided a method for detecting contamination and harmful operating conditions in a cell of an electrolyzer having a plurality of cells. The method comprises recording real-time data from the cells during operation of the electrolyzer; generating synthetic data based on historical data of the electrolyzer and the cells, the synthetic data comprising synthetic cell voltages and synthetic product output flow, synthetic anolyte pH, feed brine pH, or oxygen in chlorine gas concentration of the electrolyzer; determining cell-specific k-factors or $U_0$ from the historical data; detecting a slow contamination and harmful operating conditions when a difference between the synthetic product flow output, synthetic anolyte pH, feed brine pH, or oxygen in chlorine gas concentration and a real-time product output flow, anolyte pH, feed brine pH, or oxygen in chlorine gas concentration exceeds a first threshold; and detecting a fast contamination and harmful operating conditions when the cell-specific k-factors or $U_0$ exceed a second threshold and a trend of a difference between the synthetic cell voltages and real-time cell voltages or a derivative of the difference meets or exceeds a conditional logic rule.

In some embodiments, detecting the slow contamination or the fast contamination comprises triggering an alarm.

In some embodiments, the synthetic data is determined using predictive models that take into account normal cell degradation based on cell-specific parameters and process data.

In some embodiments, the cell-specific k-factors or $U_0$ are determined using linear model regression.

In some embodiments, the slow contamination is a slow feed electrolytes contamination of an electrolysis cell, and the fast contamination is a fast feed electrolytes contamination of an electrolysis cell.

In some embodiments, the conditional logic rule is triggered when the difference between the synthetic cell voltages and real-time cell voltages exceeds a third threshold.

In some embodiments, the conditional logic rule comprises:

FOR each $time_{window}$:

$$((\mu(r_{i=1}^n)(t) - \mu(r_{i=1}^n)(t - \delta_{short})) > \sigma_1) \cap$$
$$((\mu(r_{i=1}^n)(t) - \mu(r_{i=1}^n)(t - \delta_{long})) > \sigma_1) \cap$$
$$((\min(r_{i=1}^n)(t) - \min(r_{i=1}^n)(t - \delta_{short})) > \sigma_1) \cap$$
$$((\min(r_{i=1}^n)(t) - \min(r_{i=1}^n)(t - \delta_{long})) > \sigma_1) \cap$$
$$((\max(r_{i=1}^n)(t) - \max(r_{i=1}^n)(t - \delta_{long})) - (\min(r_{i=1}^n)(t) - \min(r_{i=1}^n)(t - \delta_{long})) > \sigma_2) \cap \left(\frac{dI}{dt} < \sigma_{maxloadchange}\right) \cap (I < NLMIN)$$

Where:
- $time_{window}$: continuous detection time sliding window;
- $r_{i=1}^n$: single cell difference between synthetic voltage and real-time voltage;
- n: total number of cells;
- µ: average of differences between synthetic voltage and real-time cell voltage for all cells;
- $\delta_{short}$: short time differential;
- $\delta_{long}$: long time differential;
- min: minimum of the differences between synthetic voltage and real-time voltage for all cells;
- max: maximum of the differences between synthetic voltage and real-time voltage for all cells;
- $\sigma_1$: maximum alarm limit during the sliding window;
- $\sigma_2$: maximum range alarm limit during the sliding window;
- $\sigma_{maxloadchange}$: maximum allowable load change during the detection time sliding window;
- I: main rectifier operation current in kilo Amperes; and
- NLMIN: minimum threshold for switching from low load to stable operation low load.

In some embodiments, the method is triggered when the electrolyzer is newly deployed at a production site or an accuracy of deployed predictive models is lower than a fourth threshold.

In some embodiments, the historical data represents non faulty electrolyzer operation at a stable current load.

In some embodiments, parameters used for generating the synthetic data are estimated using neural networks, nonlinear multivariate techniques, or switching Kalman filters.

In accordance with another broad aspect, there is provided an assembly comprising a plurality of electrolysis cells forming one or more electrolyzers and a fault detection system. The fault detection system comprises at least one computing device operatively coupled to the one or more electrolyzers, the at least one computing device comprising at least one processing unit and a non-transitory computer readable medium having stored thereon program instructions. The program instructions are executable by the at least one processing unit for recording real-time data from the cells during operation of the one or more electrolyzers; generating synthetic data based on historical data of the one or more electrolyzers and the cells, the synthetic data comprising synthetic cell voltages and synthetic product output flow, synthetic anolyte pH, feed brine pH, or oxygen in chlorine gas concentration of the one or more electrolyzers; determining cell-specific k-factors or $U_0$ from the historical data; detecting a slow contamination and harmful operating conditions when a difference between the synthetic product output flow, synthetic anolyte pH, feed brine pH, or oxygen in chlorine gas concentration and a real-time product output flow, anolyte pH, feed brine pH, or oxygen in chlorine gas concentration exceeds a first threshold; and detecting a fast contamination and harmful operating conditions when the cell-specific k-factors or $U_0$ exceed a second threshold and a trend of a difference between the synthetic cell voltages and real-time cell voltages or a derivative of the difference meets or exceeds a conditional logic rule.

In some embodiments, detecting the slow contamination or the fast contamination comprises triggering an alarm.

In some embodiments, the synthetic data is determined using predictive models that take into account normal cell degradation based on cell-specific parameters and process data.

In some embodiments, the cell-specific k-factors or $U_0$ are determined using linear model regression.

In some embodiments, the slow contamination is a slow feed electrolytes contamination of an electrolysis cell, and the fast contamination is a fast feed electrolytes contamination of an electrolysis cell.

In some embodiments, the conditional logic rule is triggered when the difference between the synthetic cell voltages and real-time cell voltages exceeds a third threshold.

In some embodiments, the conditional logic rule comprises:

FOR each $time_{window}$:

$((\mu(r_{i=1}^n)(t) - \mu(r_{i=1}^n)(t - \delta_{short})) > \sigma_1) \cap$ $((\mu(r_{i=1}^n)(t) - \mu(r_{i=1}^n)(t - \delta_{long})) > \sigma_1) \cap$ $((\min(r_{i=1}^n)(t) - \min(r_{i=1}^n)(t - \delta_{short})) > \sigma_1) \cap$ $((\min(r_{i=1}^n)(t) - \min(r_{i=1}^n)(t - \delta_{long})) > \sigma_1) \cap$ $((\max(r_{i=1}^n)(t) - \max(r_{i=1}^n)(t - \delta_{long})) - (\min(r_{i=1}^n)(t) - \min(r_{i=1}^n)(t - \delta_{long})) > \sigma_2) \cap \left(\frac{dI}{dt} < \sigma_{maxloadchange}\right) \cap (I < NLMIN)$ Where:
  $time_{window}$: continuous detection time sliding window;
  $r_{i=1}^n$: single cell difference between synthetic voltage and real-time voltage;
  n: total number of cells;
  µ: average of differences between synthetic voltage and real-time cell voltage for all cells;
  $\delta_{short}$: short time differential;
  $\delta_{long}$: long time differential;
  min: minimum of the differences between synthetic voltage and real-time voltage for all cells;
  max: maximum of the differences between synthetic voltage and real-time voltage for all cells;
  $\sigma_1$: maximum alarm limit during the sliding window;
  $\sigma_2$: maximum range alarm limit during the sliding window;
  $\sigma_{maxloadchange}$: maximum allowable load change during the detection time sliding window;
  I: main rectifier operation current in kilo Amperes; and
  NLMIN: minimum threshold for switching from low load to stable operation low load.

In some embodiments, the fault detection system is triggered when the one or more electrolyzers are newly deployed at a production site or an accuracy of deployed predictive models is lower than a fourth threshold.

In some embodiments, the historical data represents non faulty electrolyzer operation at a stable current load.

In some embodiments, parameters used for generating the synthetic data are estimated using neural networks, nonlinear multivariate techniques, or switching Kalman filters.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
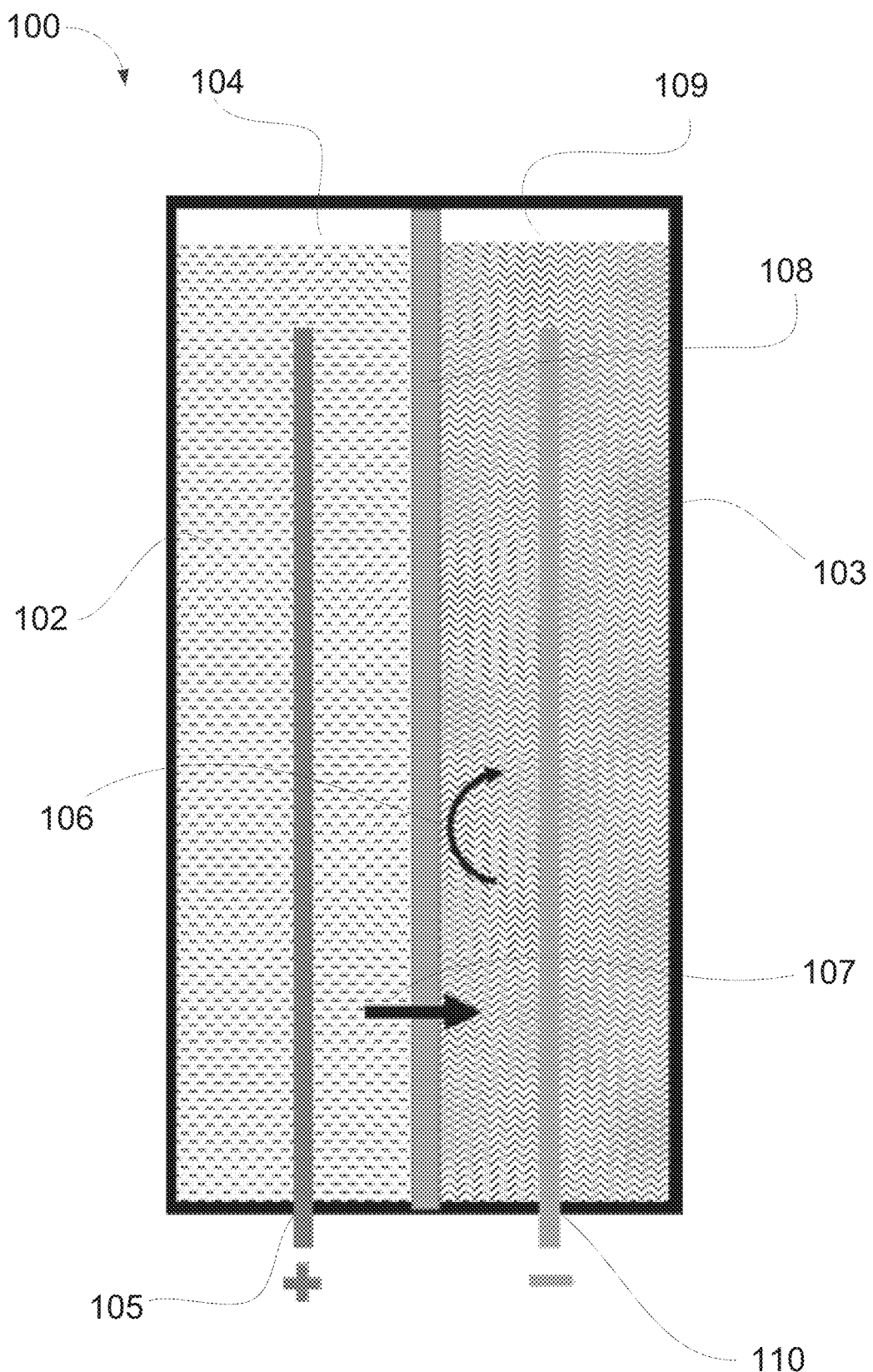
FIG. 1 is a schematic diagram of an example electrolysis cell.

The wide use of membranes as electrolysis separators in modern electrolysis industrial processes increases the requirement for feed electrolytes purity. Poor control of contaminants in feed electrolytes leads to a decrease of the membrane current efficiency and an increase in its electrical resistance and thus decreases its operation sustainability.

Contaminants in feed electrolyte can also decrease the performance of electrodes, especially its coatings and increase the cell voltage. To prevent any membrane and electrode coating damage, contaminants such as $Ca^{2+}$, $Mg^{2+}$, $Sr^{2+}$, $Ba^{2+}$, $Al^{3+}$, $SO_4^{-2}$, $SiO_2$, $Fe^{3+}$, $Ni^{2+}$, $I^-$, $F^-$, $CO_3^{2-}$ and $ClO_3^-$ should be maintained under strict levels. Poor control of these contaminants leads to physical disruption of the membrane (blister formation) or blockage of the ion-exchange sites with voltage increase and current efficiency decrease, as well as the described negative impacts on electrodes and its coatings.

As an example, in the Chlor-alkali process, to achieve the required brine purity, a treatment process is carried out with the following main steps: saturation, precipitation, clarification, filtration, polishing filtration, ion exchange electrolysis, chlorate decomposition and dechlorination. Data recording is used to control the brine purification and the cell operation. Final brine purity assessment is made by non-continuous data recording: samples of brine are taken periodically (every 4 hours or more) and combined into a daily composite. This composite is analyzed by the laboratory daily for the following: NaOH content, NaCl content, salt, caustic ratio, $NaClO_3$ content, Fe content, average temperature, specific gravity at 25° C., etc. In addition, the cell operation is monitored using the continuous (real time) recording of, but not limited to, main rectifier ampere load, each cell voltage, chlorine header pressure, hydrogen header pressure, brine and catholyte flow rates, brine pH, brine and catholyte temperatures, etc.

It has been observed in practice that failings in the non-continuous data recording causes poor qualification of the feed electrolytes purity and thus the leakage of contaminants into the electrolysis process. A layer of protection based on the predictive data modeling of real-time data recordings is thus proposed. Responsiveness of this layer of protection reduces the risk of fast and/or severe contamination causing membrane electrical resistance increase or slow accumulation of the contaminants that lead to a decline of the membrane current efficiency. Furthermore, it is well known that electrolyte contamination can occur very fast. Within an hour, membranes and electrodes can lose their performance and can cause an overall power consumption increase of the electrochemical process by more than 10%. Those fast incidents can only be prevented by real-time methods described herein.

There are described herein methods and systems for early detection of performance decline resulting from contaminated membranes occurring in an electrolysis cell functioning in series with other cells in an electrolyzer. These real-time methods of detecting impurities allow the process operators to take fast countermeasures to drop the contaminant concentrations below the recommended limit and thus partially reverse the voltage increase and minimize any irreversible performance loss. Electrolysis cell voltages and caustic product output flow, anolyte pH, feed brine pH, or oxygen in chlorine gas concentration are recorded in real-time. Cell-specific synthetic voltages and synthetic product output flow, synthetic anolyte pH, feed brine pH, or oxygen in chlorine gas concentration are constructed. The recorded and synthetic data are used to detect "fast contamination" and "slow contamination" and harmful operating conditions, as will be explained in more detail below. Although the examples used herein refer to Chlor-Alkali cells, it will be understood that the methods and systems described are applicable to other types of electrolysis cells, such as but not limited to water electrolysis, fuel cells, and the like.

FIG. 1 is a schematic representation of an example membrane cell 100 used in the Chlor-alkali industry for NaCl electrolysis. A cation-exchange membrane 108 separates the anolyte and catholyte compartments. Anode compartment 102 is filled with a saturated brine solution (NaCl) while a dilute caustic soda passes through a cathode compartment 103. In Chlor-alkali plants, chlorine ($Cl_2$) 104 is generated at a coated (for example Titanium ($T_i$)) anode 105. The combination of hydroxide ions 106 with migrated sodium ions 107 across the membrane 108 generates caustic soda (NaOH) and Hydrogen gas 109. The membrane selectively stops the migration of hydroxide ions from the cathode 110 to the anode 105. The cathode 110 may be nickel with a catalytic coating to reduce the over-potential for hydrogen ($H_2$) build up. In some embodiments, the membrane is made of perfluoropolymers to withstand the Chlor-alkali harsh conditions, such as the exposition to chlorine, anolyte and caustic solution at high temperatures (90° C.) on the anode side, and a perflurocarboxylate layer ($COO^-$) is on the cathode side. The sulfonate layer may be reinforced with PTFE for mechanical strength. Some impurities affect the anode and cathode coating, causing an overvoltage increase, or cumulates in the membrane, increasing its resistance and cell voltage. The impurities may lower the current efficiency of the membrane and thus its ability to stop the back-migration of hydroxyl ions to the anode compartment. This may be a result of physical damage caused by precipitation and crystallization of impurities inside the membrane. Impurities precipitate because the environment in the membrane changes from an acidic salt solution (pH 2-4) to a caustic solution (pH 14-15).

Figure 2:
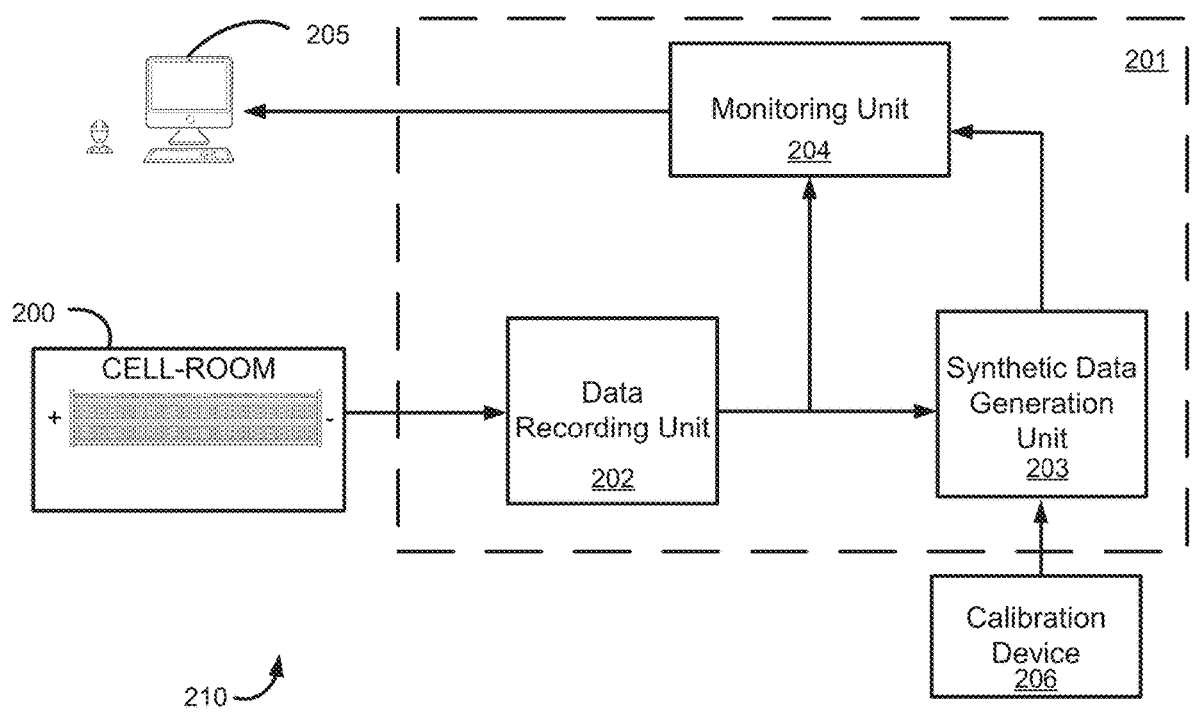
FIG. 2 is a block diagram of an example assembly for detecting contamination in a cell of an electrolyzer having a plurality of cells.

With reference to FIG. 2, there is illustrated an example embodiment of an assembly 210, comprising an electrolyzer cell-room 200 having one or more electrolyzers, where each one of the electrolyzers is composed of a plurality of electrolysis cells connected electrically in series. A fault detection system 201 is operatively coupled to the electrolyzers in the cell-room 200. The fault detection system 201 is configured to perform real-time data recording through a data recording unit 202. Data is recorded in real-time and provided to a synthetic data generation unit 203 and a monitoring unit 204. The monitoring unit 204 is coupled to the synthetic data generation unit 203 to receive synthetic data. The monitoring unit 204 is coupled to an interface 205 for displaying results and/or detected faults/alerts. Although the data recording unit 202, synthetic data generation unit 203, and monitoring unit 204 are illustrated as separate components, it will be understood that this is for illustrative purposes only and that the functionalities provided by each one of these units may be represented by one or more software and/or hardware modules, depending on practical implementation.

Data recording comprises sampling voltage measurements of the plurality of electrolysis cells during all operation modes of the electrolyzers. In addition to voltage measurements, electrical current powering each electrolyzer of the cell-room 200 is recorded, and sensor data measurements are received. The sensor data measurements may include, but are not limited to: electrolyzer catholyte outlet temperature, caustic outlet concentration, $H_2$ pressure, flow of product, and product output flow of caustic produced by the plurality of electrolyzers.

Synthetic data generation comprises calculating synthetic cell-specific voltages and synthetic product output flow of caustic, synthetic anolyte pH, feed brine pH, or oxygen in chlorine gas concentration. The calculations may be performed using nonlinear predictive models predefined and stored in a calibration device 206, which is illustrated as separate from the fault detection system 201 but in some embodiments may be integrated therewith, in part or in whole. Furthermore, single cell k-factors calculated by the calibration device 206 may be input to the fault detection system 201, for example through the synthetic data generation unit 206. For the purposes of this disclosure, a k-factor is understood as a slope of a main rectifier electrical current density versus cell electrical voltage. The k-factors may be calculated from data used to build the predictive models for the synthetic cell-specific voltages. According to another embodiment, single cell $U_0$ are calculated by the calibration device 206. For the purposes of this disclosure, the $U_0$ is understood as an intercept of a main rectifier electrical current density versus cell electrical voltage, it can be calculated from data used to build the predictive models for the synthetic cell-specific voltages.

The interface 205 may be used to display alarms triggered by the fault detection system 201. Based on these alarms, a human operator can take counter measure actions to reduce the impact of the contamination, such us stopping the electrolysis process and/or fixing the filtration process to reduce the impurities levels under the recommended levels.

According to an example embodiment, the fault detection system 201 detects a slow contamination and harmful operating conditions if the difference between non synthetic and synthetic caustic product output flow exceeds a threshold. Similarly, fast contamination and harmful operating conditions are detected if the cell-specific calculated k-factor exceeds a threshold and if a conditional logic rule based on the difference between the single cell synthetic and real-time voltages is met. In some embodiments, the conditional logic rule is triggered when the difference between the synthetic cell voltages and real-time cell voltages exceeds a threshold.

An example embodiment of the conditional logic rule is as follows:

FOR each $time_{window}$:

$((\mu(r_{i=1}^n)(t) - \mu(r_{i=1}^n)(t - \delta_{short})) > \sigma_1) \cap$ $((\mu(r_{i=1}^n)(t) - \mu(r_{i=1}^n)(t - \delta_{long})) > \sigma_1) \cap$ $((\min(r_{i=1}^n)(t) - \min(r_{i=1}^n)(t - \delta_{short})) > \sigma_1) \cap$ $((\min(r_{i=1}^n)(t) - \min(r_{i=1}^n)(t - \delta_{long})) > \sigma_1) \cap$ $((\max(r_{i=1}^n)(t) - \max(r_{i=1}^n)(t - \delta_{long})) - (\min(r_{i=1}^n)(t) - \min(r_{i=1}^n)(t - \delta_{long})) >$ $\sigma_2) \cap \left(\frac{dI}{dt} < \sigma_{maxloadchange}\right) \cap (I < NLMIN)$ Where:
- $time_{window}$: continuous detection time sliding window, e.g. 10 minutes;
- $r_{i=1}^n$: single cell difference between synthetic voltage and real-time voltage recorded; also known as residuals
- n: total numbers of cells in the cell-room;
- μ: average of the differences between synthetic voltage and real-time voltage for all cells in the cell-room;
- $\delta_{short}$: short time differential, e.g. 1 minute;
- $\delta_{long}$: long time differential, e.g. 5 minutes;
- min: minimum of the differences between single cell synthetic voltage and real-time voltage for all cells in the cell-room;
- max: maximum of the differences between single cell synthetic voltage and real-time voltage for all cells in the cell-room;
- $\sigma_1$: maximum alarm limit during the sliding window, e.g. 50 millivolts;
- $\sigma_2$: maximum range alarm limit during the sliding window, e.g. 25 millivolts;
- $\sigma_{maxloadchange}$: maximum allowable load change during the detection time sliding window, e.g. 1% of the maximum operation main rectifier current in kilo Amperes;
- I: main rectifier operation current in kilo Amperes; and
- NLMIN: minimum threshold for switching from low load to stable operation low load of the cell-room.

The conditional logic rules are based on the difference between single cell synthetic voltage and single cell real-time voltage. It will be understood that certain modifications may be made to the example conditional logic rule above while still capturing the essence of fast contamination detection based on the difference between single cell synthetic voltage and single cell real-time voltage. For example, instead of the average of the differences, other aggregations such us the median may be used. The min-max range of the $\delta_{short}$, $\delta_{long}$ time period may be replaced by the variance. Another alternative may be to track a smoothed segmentation of a differences trend to detect fast contamination. Segmentation may be calculated by building the derivative of the residuals at time t and $\delta_{short}$, $\delta_{long}$. Other variations may also be applied.

Figures 3A, 3B:
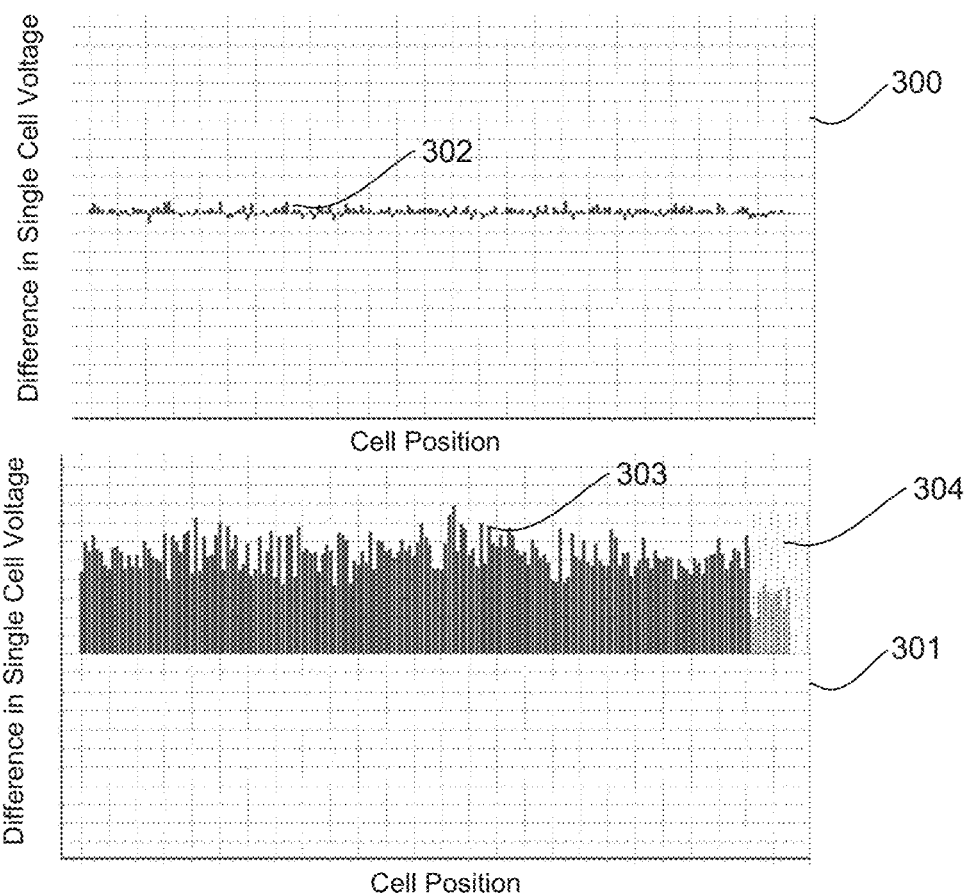
FIGS. 3A-3B are graphs illustrating an example of fast contamination.

Referring to FIGS. 3A-3B, there is depicted a non-limiting example of a fast contamination. Graph 300 of FIG. 3A illustrates a difference 302 between synthetic and non-synthetic voltages for a plurality of cells in an operating electrolyzer with an adequate control of contaminant levels. Graph 301 of FIG. 3B illustrates a difference 303 between synthetic and non-synthetic voltages for a plurality of cells in an operating electrolyzer where a fast contamination has occurred. The trend of the difference 303 is used with the conditional logic rule described above to detect fast contamination. As shown, a group of cells 304 may be less affected by the contamination due to a different intrinsic membrane design compared to other cells.

Figure 4:
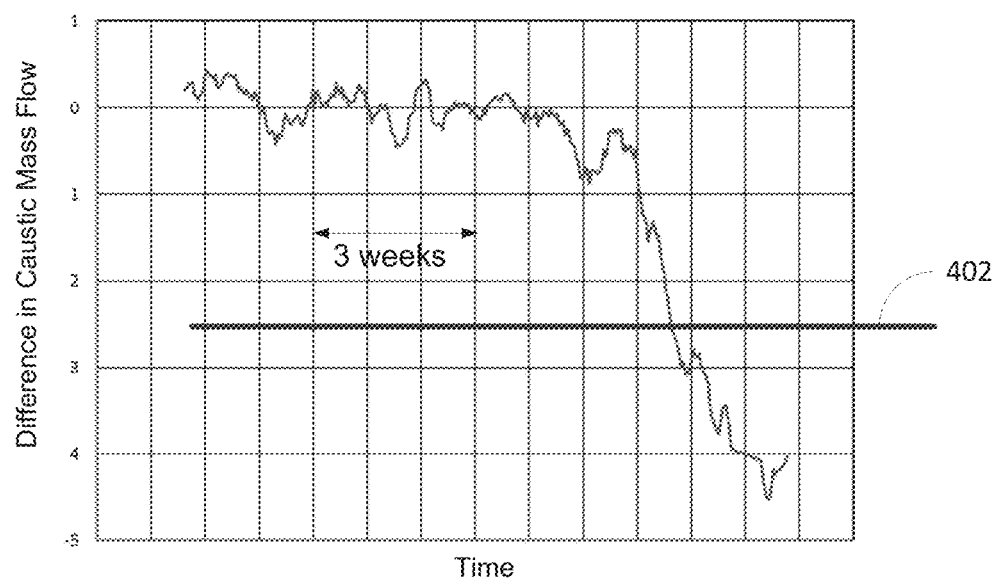
FIG. 4 is a graph illustrating an example of slow contamination.

FIG. 4 illustrates a non-limiting example of cell-room slow contamination detection represented by a continuous decrease of the difference between measured and synthetic caustic product output flow, synthetic anolyte pH, feed brine pH, or oxygen in chlorine gas concentration over time. When threshold 402 is reached, slow contamination is detected.

Figure 5A:
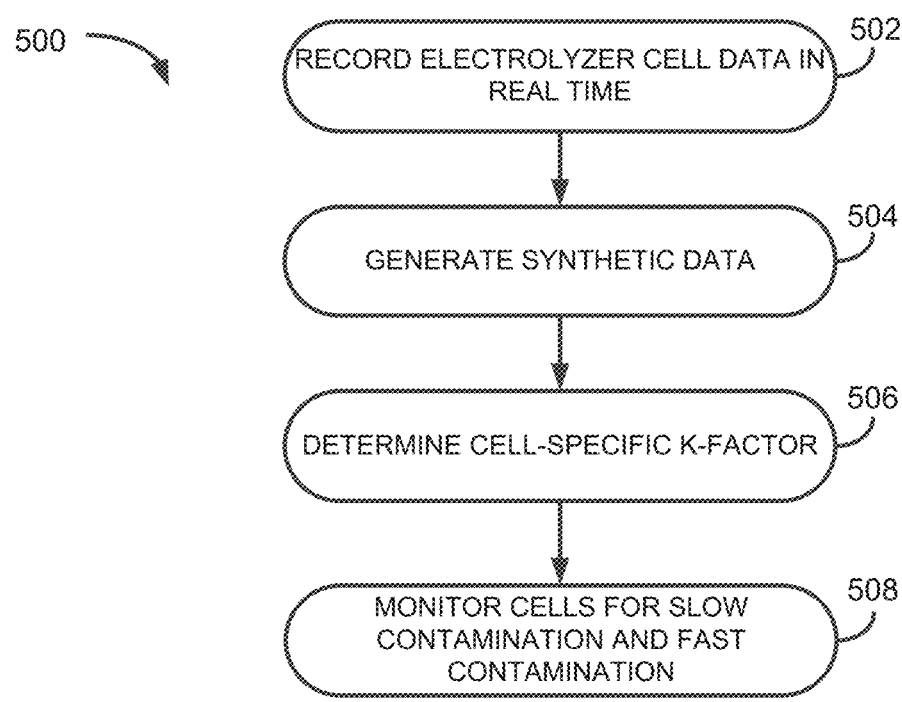
FIG. 5A is a flowchart of an example method for detecting contamination in a cell of an electrolyzer having a plurality of cells.

Referring to FIG. 5A, there is illustrated a flowchart of an example method 500 of operating the fault detection system 201. At step 502, real-time data is recorded from the cells of the cell-room 200 during operation of the electrolyzers. At step 504, synthetic data is generated based on historical data of the electrolyzers and the cells. The synthetic data comprises synthetic cell voltages and a synthetic product output flow, synthetic anolyte pH, feed brine pH, or oxygen in chlorine gas concentration of the electrolyzers, i.e. a measure of the produced caustic product output flow, anolyte pH, feed brine pH, or oxygen in chlorine gas concentration.

At step 506, cell-specific k-factors or $U_0$ are determined, which may comprise reading the cell-specific k-factors or $U_0$ from a memory or from another device, such as the calibration device 206, or calculating them from historical data of the electrolyzer. In some embodiments, the k-factor or $U_0$ may be calculated respectively as the slope or the intercept of the linear regression of the main rectifier current density to the single cell corrected voltage, and the single cell corrected voltage is calculated by the linear standardization of the single cell voltage measurement to the electrolyzer catholyte outlet temperature and caustic concentration.

At step 508, the cells of the electrolyzers are monitored for slow contamination and fast contamination. Slow contamination is detected when a difference between the synthetic product output flow, synthetic anolyte pH, feed brine pH, or oxygen in chlorine gas concentration, and a real-time product output flow, anolyte pH, feed brine pH, or oxygen in chlorine gas concentration exceeds a threshold. For instance, slow contamination is detected when a difference between real-time product output flow and synthetic product output flow, or a difference between real-time anolyte pH and synthetic anolyte pH, or a difference between real-time feed brine pH and synthetic feed brine pH, or a difference between real-time oxygen in chlorine gas concentration and synthetic oxygen in chlorine gas concentration exceeds the threshold. Fast contamination is detected when the cell-specific k-factor exceeds a second threshold and a trend of a difference between the synthetic cell voltages and real-time cell voltages meets the conditional logic rule.

The method 500 may be repeated any number of times, at random, regular, or predetermined intervals. In some embodiments, the method 500 is performed continuously until at least one fault is detected. Other embodiments may also apply.

Figure 5B:
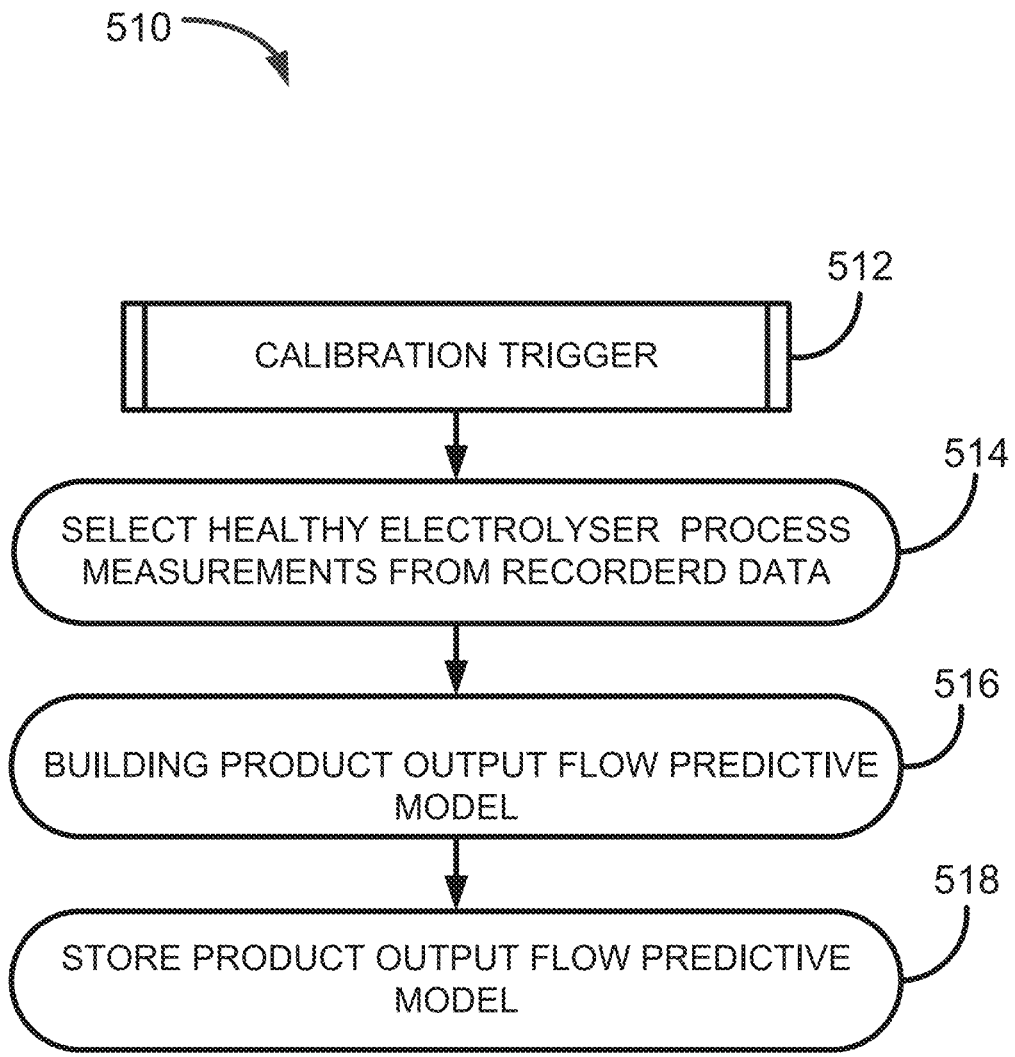
FIG. 5B is a flowchart of an example method used for slow contamination detection.

Slow and fast contamination detection are performed on the basis of certain models, which may be determined by the calibration device 206. These models include but are not limited to a model for synthetic voltage and a model for product output flow, anolyte pH, feed brine pH, or oxygen in chlorine gas concentration. Referring to FIG. 5B, there is illustrated a flowchart of an example method 510 used for slow contamination detection, as performed by the calibration device 206 or the fault detection system 201. Step 512 initiates the process of building the caustic product output flow predictive model. The calibration may be triggered, for example, if the system is newly deployed in an industrial production site, or if the accuracy of existing predictive models is lower than a threshold. According to an example embodiment, the accuracy of the predictive model is calculated by subtracting the real-time recorded caustic product output flow, anolyte pH, feed brine pH, or oxygen in chlorine gas concentration from the synthetic caustic product output flow, synthetic anolyte pH, feed brine pH, or oxygen in chlorine gas concentration.

At step 514 recently recorded historical data representing non faulty cell-room operation at a stable current load is selected. According to some embodiments, the duration of selected data ranges from 10 to 30 days of operation. Selected process data includes but is not limited to: electrolyzers main current rectifier, electrolyzers catholyte outlet temperature, caustic outlet concentration, $H_2$ pressure, flow of product, and product output flow.

At step 516, the synthetic product output flow mathematical function composed of estimated parameters is calculated. A non-limiting example of this function is described below:

$$\tilde{m}[\text{tons/caustic dry } 100\%/\text{hour}]g(I_{i=1}^{NE}(t-d\ldots t), T_{i=1}^{NE}(t-d\ldots t), P_{H_2}(t-d\ldots t), CC(t-d\ldots t))$$

Where g is non-linear function, I is the main rectifier electrical current for each of the electrolyzers in the selected data, T is catholyte outlet temperature for each of the electrolyzers in the selected data, NE is the number of electrolyzers, $P_{H_2}$ is measured hydrogen pressure in the selected data, and d is a backward time delay. In an alternative embodiment, the flow of product measured by a product output flow meter is used. According to one embodiment, parameters of function g are estimated using a neural-network model. According to an alternative embodiment, parameters of the function g are estimated using Kalman switching filters or non-linear multivariate regression techniques. The estimated parameters of the function g are stored at step 518.

Figure 5C:
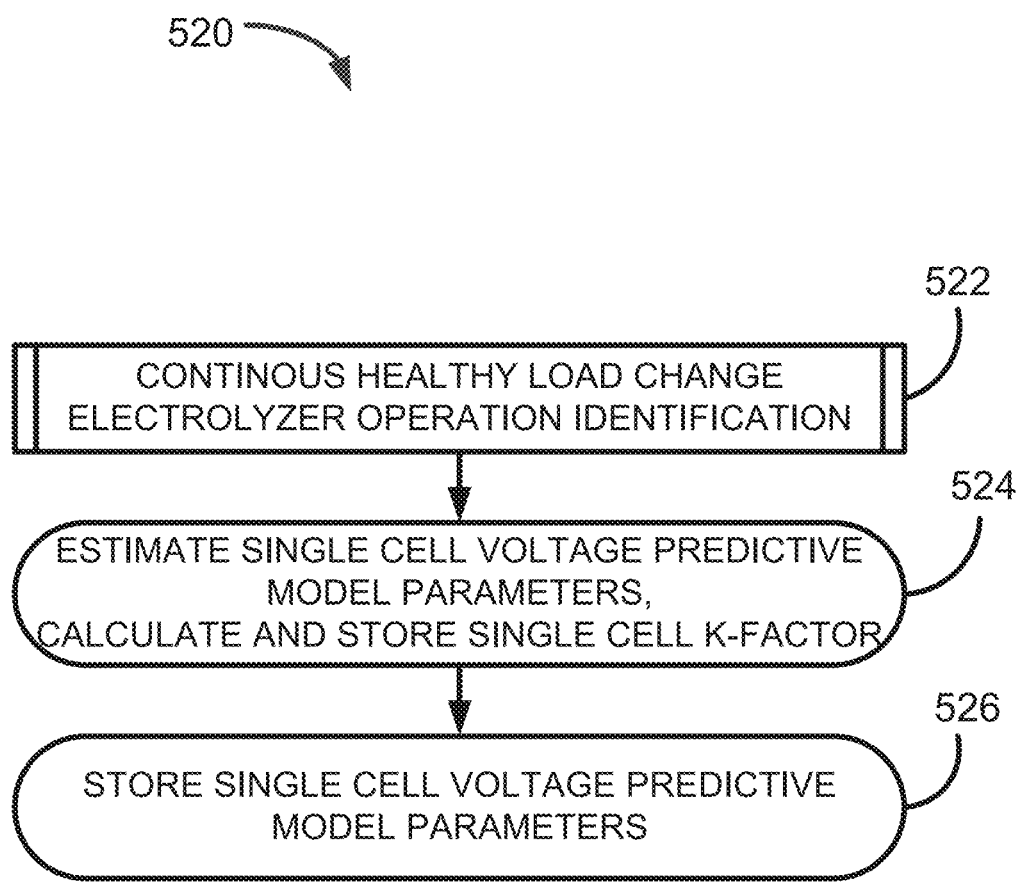
FIG. 5C is a flowchart of an example method used for fast contamination detection.
Figure 6:
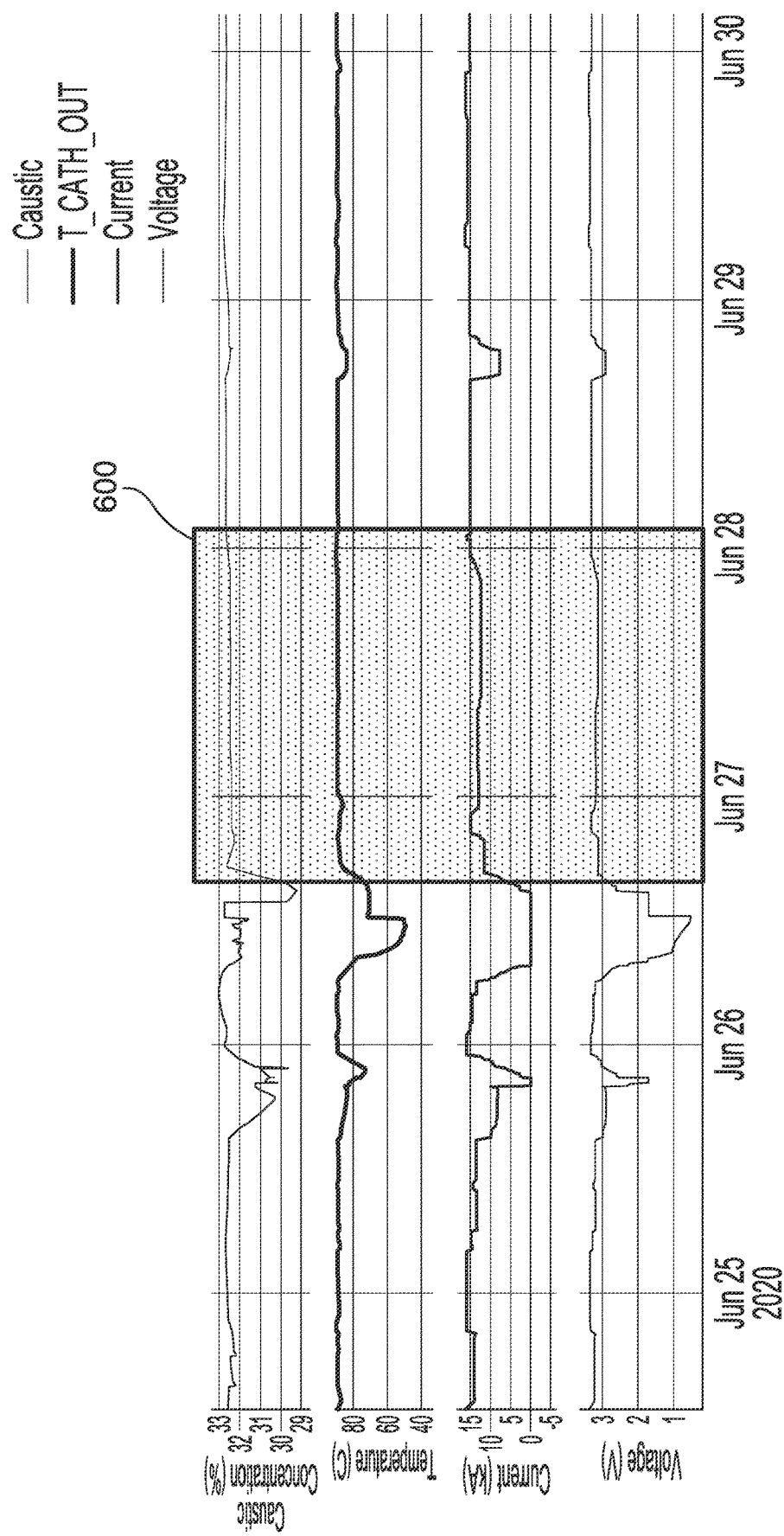
FIG. 6 is an example of data selection.

Referring to FIG. 5C, there is illustrated an example method 520 used for fast contamination detection, as performed by the calibration device 206 or the fault detection system 201. Step 522 executes the data selection process for building the synthetic single cell voltage nonlinear predictive model. FIG. 6 depicts a non-limiting example of operation data selected by step 522. According to some embodiments, relevant data for building single cell voltage predictive models is continuously selected during the sequence of electrical current ramp up and stabilization at maximum load during a given time frame, such as 72 hours. At step 524 single cell synthetic mathematical functions composed of various estimated parameters are executed. Some of these parameters are operation specific, identical for all the cells that perform the electrolysis for the same operating conditions. Some of the parameters are cell-specific parameters. A non-limiting example of the mathematical function for synthetic single voltage is described below:

$$\tilde{v}[\text{volts}] = f(I(t-d\ldots t), T(t-d\ldots t), C(t-d\ldots t))$$

Where $f$ is any linear or non-linear function, I is main rectifier current, T is catholyte outlet temperature, CC is caustic concentration, t is a time stamp, d is a backward time delay. According to one embodiment, parameters of function $f$ are estimated using a neural-network model based on an encoder-decoder, where the decoder is replaced with a predictor—a subnetwork that predicts the cell's voltage. A neural encoder is a type of neural architecture whose objective is to take an input vector and reduce its dimensionality to a desired one. It may be paired with a decoder. The decoder receives the output of the encoder and transforms it to minimize an objective function. The neural encoder may be used to find features that represent the specificity of the cells at operation cycles and thus the normal degradation. The predictor may consider temporal delays of the measurements. The predictor does not use the measured voltage as an input, yet it is still able to predict a different voltage for each cell, despite using the same operating conditions as input. It accomplishes this by taking the output of the encoder as an input, which is unique for each cell. Hence, the voltage prediction is not biased by the cell's measured voltage. According to an alternative embodiment of step 524, parameters of the function $f$ are estimated using Kalman switching filters or non-linear multivariate regression techniques. Step 526 stores estimated parameters of the function $f$.

Figure 7:
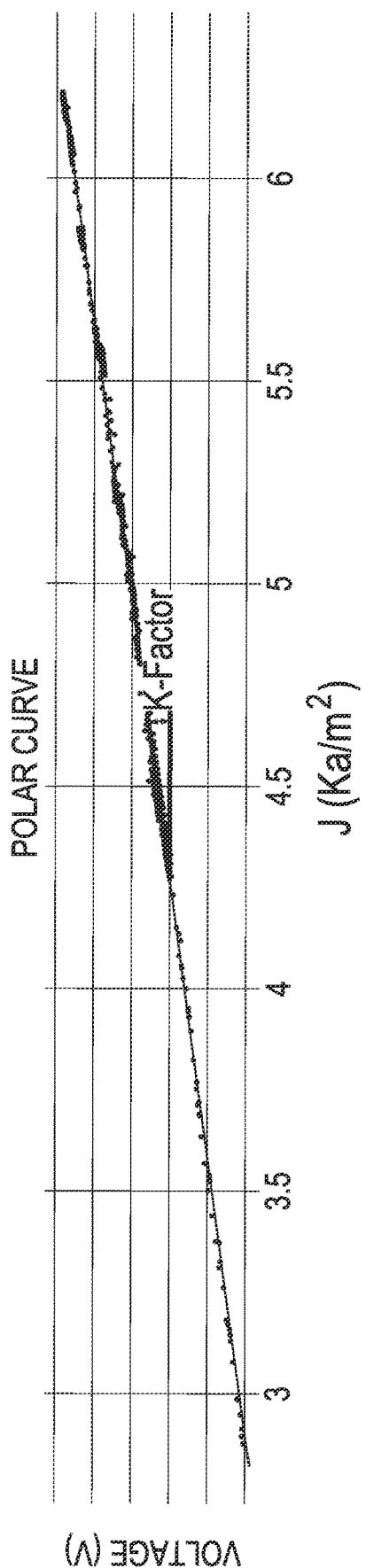
FIG. 7 is an example of the cell specific k-Factor.

Referring to FIG. 7, there is illustrated an example of the k-Factor as calculated and stored at step 524. According to an embodiment, the k-factor is the slope of the linear regression applied on selected data samples from step 522. The linear regression is executed on selected single cell voltages corrected to electrolyzer outlet catholyte temperature (C°), caustic outlet concentration (% w/w) and the electrolyzer current density (electrical current divided by cell area) at step 524. The equation below describes the correction of the single cell voltage according to the embodiment:

$$v_{corrected}[\text{volts}] = v - ((\text{ref}_{temp} - \text{Temp}) \times CT \times J - (\text{ref}_{conc} - \text{Conc}) \times CC \times J)$$

Where v is the single cell voltage (volts) from a selected time period, $\text{ref}_{temp}$ is the outlet catholyte temperature operation reference constant in degrees Celsius, CT is the outlet catholyte temperature operation correction constant, Temp is the measured catholyte temperature during selected data, $\text{ref}_{conc}$ is the caustic outlet concentration operation reference constant in % w/w, CC is the caustic outlet concentration correction constant, Conc is the measured caustic concentration during selected data, and J is the current density in Kilo Amperes per square meters calculated by dividing the electric current by the cell Area.

It will be understood that methods 510, 520 may, in some embodiments, be performed, in whole or in part, by the fault detection system 201, for example by the synthetic data generation unit 203. In some embodiments, the calibration device 206 provides the models on which the synthetic data are based and the calculations are performed by the synthetic data generation unit.

In one specific and non-limiting example, the fault detection method is implemented as follows. The calibration device 206 selects historical data to build a predictive model for the synthetic voltage, selects historical data to build a predictive model for the product output flow, anolyte pH, feed brine pH, or oxygen in chlorine gas concentration, builds the predictive model for the synthetic voltage, and calculates k-factors or $U_0$ from the historical data for building the model for the synthetic voltage. The synthetic unit 203 calculates synthetic voltages using the predictive model for the synthetic voltage and calculates the synthetic product output flow using the predictive model for the synthetic product output flow. The monitoring unit 204 executes the conditional logic rule for the trends on the differences between the synthetic and real time voltages, calculates the differences between the synthetic and real time product output flow, anolyte pH, feed brine pH, or oxygen in chlorine gas concentration, and monitors the k-factors. The monitoring unit 204 issues an alert when the conditional logic rule is met and/or the product output flow difference crosses a threshold and/or the range of k-factors or $U_0$ exceed a threshold for all cells.

Figure 8:
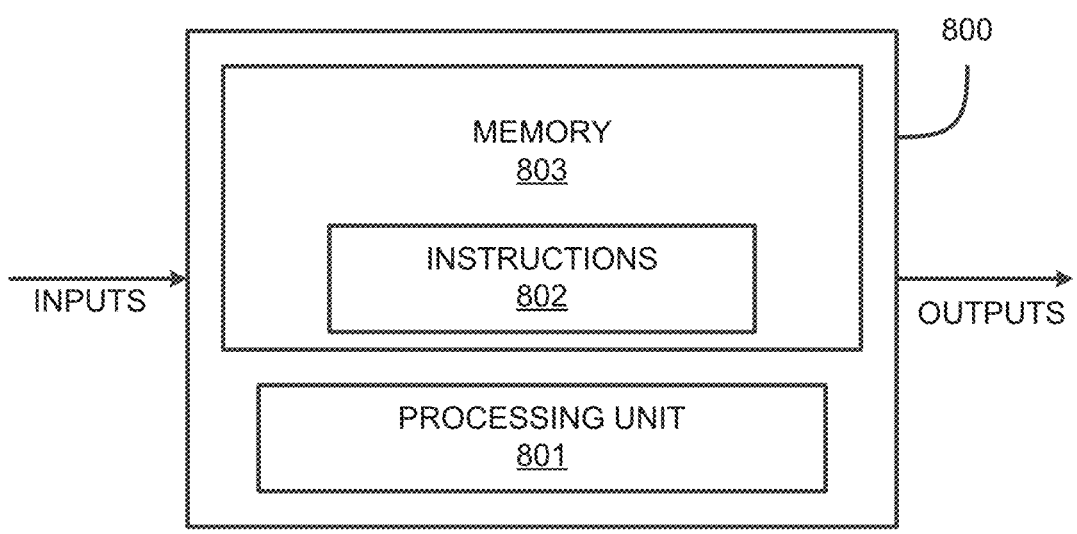
FIG. 8 is a block diagram of an example computing device.

FIG. 8 is an example embodiment of a computing device 800 for implementing one or more of the methods 500, 510, 520 for detecting contamination in a cell of an electrolyzer having a plurality of cells. In some embodiments, the fault detection system and/or the calibration device 206 is implemented using one or more computing device 800. The computing device 800 comprises a processing unit 801 and a memory 803 which has stored therein computer-executable instructions 802. The processing unit 801 may comprise any suitable devices configured to cause a series of steps to be performed such that instructions 802, when executed by the computing device 800 or other programmable apparatus, may cause the functions/acts/steps specified in the methods 500, 510, 520 described herein to be executed. The processing unit 801 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 803 may comprise any suitable known or other machine-readable storage medium. The memory 803 may comprise a non-transitory computer readable storage medium, for example, but not limited to, an electronic, magnetic, optical, electromagnetic, infrared, or semiconductor system, apparatus, or device, or any suitable combination of the foregoing. The memory 803 may include a suitable combination of any type of computer memory that is located either internally or externally to device, for example random-access memory (RAM), read-only memory (ROM), electro-optical memory, magneto-optical memory, erasable programmable read-only memory (EPROM), and electrically erasable programmable read-only memory (EEPROM), Ferroelectric RAM (FRAM) or the like. Memory 803 may comprise any storage means (e.g., devices) suitable for retrievably storing machine-readable instructions 802 executable by processing unit 801.

It should be noted that the techniques described herein can be performed by one or more computing device 800 substantially in real-time.

The methods and systems for detecting contamination in a cell of an electrolyzer having a plurality of cells as described herein may be implemented in a high level procedural or object oriented programming or scripting language, or a combination thereof, to communicate with or assist in the operation of a computer system, for example the computing device 800. Alternatively, the methods and systems for detecting contamination in a cell of an electrolyzer having a plurality of cells may be implemented in assembly or machine language. The language may be a compiled or interpreted language. Program code for implementing the methods and systems for detecting a fault in an electrolyzer may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting contamination in a cell of an electrolyzer having a plurality of cells may also be considered to be implemented by way of a non-transitory computer-readable storage medium having a computer program stored thereon. The computer program may comprise computer-readable instructions which cause a computer, or more specifically the processing unit 801 of the computing device 800, to operate in a specific and predefined manner to perform the functions described herein.

Computer-executable instructions may be in many forms, including program modules, executed by one or more computers or other devices. Generally, program modules include routines, programs, objects, components, data structures, etc., that perform tasks or implement particular abstract data types. Typically, the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, software modules may be combined or separated in different manners in order to perform the steps of the methods 500, 510, 520, or the specific devices used to obtain the various measurements from the electrolysis cells and/or electrolyzer may vary. Yet further modifications could be implemented by a person of ordinary skill in the art in view of the present disclosure, which modifications would be within the scope of the present technology.

The invention claimed is:

1. A method for detecting contamination and harmful operating conditions in a cell of an electrolyzer having a plurality of cells, the method comprising:

recording real-time data from the cells during operation of the electrolyzer;

generating synthetic data based on historical data of the electrolyzer and the cells, the synthetic data comprising synthetic cell voltages and synthetic product output flow, synthetic anolyte pH, feed brine pH, or oxygen in chlorine gas concentration of the electrolyzer;

determining cell-specific k-factors or $U_0$ from the historical data of the electrolyzer and the cells;

detecting a slow contamination and harmful operating conditions when a difference between the synthetic product output flow, synthetic anolyte pH, feed brine pH, or oxygen in chlorine gas concentration and a real-time product output flow, anolyte pH, feed brine pH, or oxygen in chlorine gas concentration exceeds a first threshold; and detecting a fast contamination and harmful operating conditions when the cell-specific k-factors or $U_0$ exceed a second threshold and a trend of a difference between the synthetic cell voltages and real-time cell voltages or a derivative of the difference meets or exceeds a conditional logic rule.

2. The method of claim 1, wherein detecting the slow contamination or the fast contamination comprises triggering an alarm.

3. The method of claim 1, wherein the synthetic data is determined using predictive models that take into account normal cell degradation based on cell-specific parameters and process data.

4. The method of claim 1, wherein the cell-specific k-factors or $U_0$ are determined using linear model regression.

5. The method of claim 1, wherein the slow contamination is a slow feed electrolytes contamination of an electrolysis cell, and the fast contamination is a fast feed electrolytes contamination of an electrolysis cell.

6. The method of claim 1, wherein the conditional logic rule is triggered when the difference between the synthetic cell voltages and real-time cell voltages exceeds a third threshold.

7. The method of claim 1, wherein the conditional logic rule comprises:

FOR each $time_{window}$:

$((\mu(r_{i=1}^n)(t) - \mu(r_{i=1}^n)(t - \delta_{short})) > \sigma_1) \cap$ $((\mu(r_{i=1}^n)(t) - \mu(r_{i=1}^n)(t - \delta_{long})) > \sigma_1) \cap$ $((\min(r_{i=1}^n)(t) - \min(r_{i=1}^n)(t - \delta_{short})) > \sigma_1) \cap$ $((\min(r_{i=1}^n)(t) - \min(r_{i=1}^n)(t - \delta_{long})) > \sigma_1) \cap$ $((\max(r_{i=1}^n)(t) - \max(r_{i=1}^n)(t - \delta_{long})) - (\min(r_{i=1}^n)(t) - \min(r_{i=1}^n)(t - \delta_{long})) > \sigma_2) \cap \left(\frac{dI}{dt} < \sigma_{maxloadchange}\right) \cap (I < NLMIN)$ Where:

$time_{window}$: continuous detection time sliding window;

$r_{i=1}^n$: single cell difference between synthetic voltage and real-time voltage;

n: total number of cells;

μ: average of differences between synthetic voltage and real-time cell voltage for all cells;

$\delta_{short}$: short time differential;

$\delta_{long}$: long time differential;

min: minimum of the differences between synthetic voltage and real-time voltage for all cells;

max: maximum of the differences between synthetic voltage and real-time voltage for all cells;

$\sigma_1$: maximum alarm limit during the sliding window;

$\sigma_2$: maximum range alarm limit during the sliding window;

$\sigma_{maxloadchange}$: maximum allowable load change during the detection time sliding window;

I: main rectifier operation current in kilo Amperes; and

NLMIN: minimum threshold for switching from low load to stable operation low load.

8. The method of claim 1, wherein the method is triggered when the electrolyzer is newly deployed at a production site or an accuracy of deployed predictive models is lower than a fourth threshold.

9. The method of claim 1, wherein the historical data represents non faulty electrolyzer operation at a stable current load.

10. The method of claim 1, wherein parameters used for generating the synthetic data are estimated using neural networks, nonlinear multivariate techniques, or switching Kalman filters.

11. An assembly comprising:

a plurality of electrolysis cells forming one or more electrolyzers; and a fault detection system comprising at least one computing device operatively coupled to the one or more electrolyzers, the at least one computing device comprising at least one processing unit and a non-transitory computer readable medium having stored thereon program instructions executable by the at least one processing unit for:

recording real-time data from the cells during operation of the one or more electrolyzers;

generating synthetic data based on historical data of the one or more electrolyzers and the cells, the synthetic data comprising synthetic cell voltages and a synthetic product output flow, synthetic anolyte pH, feed brine pH, or oxygen in chlorine gas concentration of the one or more electrolyzers;

determining cell-specific k-factors or $U_0$ from the historical data of the one or more electrolyzers and the cells;

detecting a slow contamination and harmful operating conditions when a difference between the synthetic product output flow, synthetic anolyte pH, feed brine pH, or oxygen in chlorine gas concentration and a real-time product output flow, anolyte pH, feed brine pH, or oxygen in chlorine gas concentration exceeds a first threshold; and detecting a fast contamination and harmful operating conditions when the cell-specific k-factors or $U_0$ exceed a second threshold and a trend of a difference between the synthetic cell voltages and real-time cell voltages or a derivative of the difference meets or exceeds a conditional logic rule.

12. The assembly of claim 11, wherein detecting the slow contamination or the fast contamination comprises triggering an alarm.

13. The assembly of claim 11, wherein the synthetic data is determined using predictive models that take into account normal cell degradation based on cell-specific parameters and process data.

14. The assembly of claim 11, wherein the cell-specific k-factors or $U_0$ are determined using linear model regression.

15. The assembly of claim 11, wherein the slow contamination is a slow feed electrolytes contamination of an electrolysis cell, and the fast contamination is a fast feed electrolytes contamination of an electrolysis cell.

16. The assembly of claim 11, wherein the conditional logic rule is triggered when the difference between the synthetic cell voltages and real-time cell voltages exceeds a third threshold.

17. The assembly of claim 11, wherein the conditional logic rule comprises:

FOR each $time_{window}$:

$((\mu(r_{i=1}^n)(t) - \mu(r_{i=1}^n)(t - \delta_{short})) > \sigma_1) \cap$ $((\mu(r_{i=1}^n)(t) - \mu(r_{i=1}^n)(t - \delta_{long})) > \sigma_1) \cap$ $((\min(r_{i=1}^n)(t) - \min(r_{i=1}^n)(t - \delta_{short})) > \sigma_1) \cap$ $((\min(r_{i=1}^n)(t) - \min(r_{i=1}^n)(t - \delta_{long})) > \sigma_1) \cap$ $((\max(r_{i=1}^n)(t) - \max(r_{i=1}^n)(t - \delta_{long})) - (\min(r_{i=1}^n)(t) - \min(r_{i=1}^n)(t - \delta_{long})) >$ $\sigma_2) \cap \left(\dfrac{dI}{dt} < \sigma_{maxloadchange}\right) \cap (I < NLMIN)$ Where:

$time_{window}$: continuous detection time sliding window;
$r_{i=1}^n$: single cell difference between synthetic voltage and real-time voltage;
n: total number of cells;
$\mu$: average of differences between synthetic voltage and real-time cell voltage for all cells;
$\delta_{short}$: short time differential;
$\delta_{long}$: long time differential;
min: minimum of the differences between synthetic voltage and real-time voltage for all cells;
max: maximum of the differences between synthetic voltage and real-time voltage for all cells;
$\sigma_1$: maximum alarm limit during the sliding window;
$\sigma_2$: maximum range alarm limit during the sliding window;
$\sigma_{maxloadchange}$: maximum allowable load change during the detection time sliding window;
I: main rectifier operation current in kilo Amperes; and
NLMIN: minimum threshold for switching from low load to stable operation low load.

18. The assembly of claim 11, wherein the fault detection system is triggered when the one or more electrolyzers are newly deployed at a production site or an accuracy of deployed predictive models is lower than a fourth threshold.

19. The assembly of claim 11, wherein the historical data represents non faulty electrolyzer operation at a stable current load.

20. The assembly of claim 11, wherein parameters used for generating the synthetic data are estimated using neural networks, nonlinear multivariate techniques, or switching Kalman filters.

* * * * *